US008560299B2

(12) United States Patent
Liu et al.

(10) Patent No.: US 8,560,299 B2
(45) Date of Patent: Oct. 15, 2013

(54) OPENING A MESSAGE CATALOG FILE FOR A LANGUAGE THAT IS NOT INSTALLED

(75) Inventors: Su Liu, Round Rock, TX (US); George F. Ramsay, III, Elgin, TX (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 12/770,020

(22) Filed: Apr. 29, 2010

(65) Prior Publication Data

US 2011/0270602 A1    Nov. 3, 2011

(51) Int. Cl.
*G06F 17/30* (2006.01)
*G06F 15/16* (2006.01)

(52) U.S. Cl.
USPC ............ 704/7; 704/2; 704/8; 704/9; 709/206; 709/203

(58) Field of Classification Search
USPC ................... 704/2, 3, 7–9, 4, 270.1; 709/206; 705/51
See application file for complete search history.

(56) References Cited

U.S. PATENT DOCUMENTS

| | | | | |
|---|---|---|---|---|
| 5,524,253 | A * | 6/1996 | Pham et al. | 709/202 |
| 5,680,585 | A | 10/1997 | Bruell | 703/26 |
| 5,778,356 | A * | 7/1998 | Heiny | 1/1 |
| 6,469,713 | B2 | 10/2002 | Hetherington et al. | 715/740 |
| 6,865,716 | B1 | 3/2005 | Thurston | 715/207 |
| 6,980,962 | B1 * | 12/2005 | Arganbright et al. | 705/14.31 |
| 7,024,365 | B1 * | 4/2006 | Koff et al. | 704/270.1 |
| 7,035,828 | B2 * | 4/2006 | Ketonen et al. | 705/51 |
| 7,257,583 | B2 * | 8/2007 | Hofmeister et al. | 1/1 |
| 7,359,871 | B1 * | 4/2008 | Paasche et al. | 705/26.8 |
| 7,617,522 | B2 | 11/2009 | Schmidt et al. | 726/2 |
| 7,631,043 | B2 * | 12/2009 | Burns et al. | 709/206 |
| 7,653,529 | B2 | 1/2010 | Litster et al. | 704/8 |
| 7,657,554 | B2 | 2/2010 | Murphy et al. | 715/206 |
| 7,941,484 | B2 * | 5/2011 | Chandler et al. | 709/204 |
| 8,201,156 | B1 | 6/2012 | Pohorsky et al. | |
| 8,359,234 | B2 * | 1/2013 | Vieri | 705/14.49 |
| 2002/0143523 | A1 | 10/2002 | Balaji et al. | 704/8 |
| 2003/0182624 | A1 | 9/2003 | Large | |
| 2004/0138969 | A1 | 7/2004 | Goldsmith et al. | |
| 2004/0158451 | A1 | 8/2004 | Mussini | |
| 2004/0267758 | A1 * | 12/2004 | Katsurashima | 707/10 |
| 2006/0101034 | A1 * | 5/2006 | Murphy et al. | 707/100 |
| 2006/0235764 | A1 * | 10/2006 | Bamborough et al. | 705/26 |
| 2007/0288488 | A1 | 12/2007 | Rohrs et al. | 707/100 |
| 2008/0270180 | A1 | 10/2008 | Sholtis et al. | |

OTHER PUBLICATIONS

"A Method for Dynamically Changing Language/Locale Environment in Server Side Based on Different Client Requests in a Network," IBM, ip.com No. IPCOM000192624D, Jan. 2010.

Notice of Allowance for U.S. Appl. No. 13/451,502 (Liu et al., "Opening a Message Catalog File for a Language That Is Not Installed," filed Apr. 19, 2012), U.S. Patent and Trademark Office, mailed Apr. 15, 2013, 13 pages.

* cited by examiner (Continued)

*Primary Examiner* — Pierre-Louis Desir
*Assistant Examiner* — Abdelali Serrou
(74) *Attorney, Agent, or Firm* — VanLeeuwen & VanLeeuwen; Libby Z. Toub

(57) ABSTRACT

A first computer system sends a request to a second computer system. The second computer system determines that the first computer system utilizes a message catalog file that is not installed on the second computer system. As a result, the second computer system sends a catalog request that requests the message catalog file. The second computer system receives the message catalog file and sends a response message from the second computer system to the first computer system using the received message catalog file.

9 Claims, 7 Drawing Sheets

OPENING A MESSAGE CATALOG FILE FOR A LANGUAGE THAT IS NOT INSTALLED

TECHNICAL FIELD

The present disclosure relates to acquiring a message catalog file in order to respond to a client's request using message strings written in a particular language.

BACKGROUND

In today's network environment, computing devices may utilize a message catalog file to formulate and send messages to other computing devices. The message catalog files are typically based upon a computing system's regional location, such as Japan, United States, China, etc. As such, a multilingual network includes different servers and clients using different message catalog files that may specify different language and locale configurations. When a client connects to and communicates with a server, the client's message catalog file may include different language/locale settings than those included in the server's message catalog file. The language/locale settings may include a set of parameters that defines a language to display, a country, and/or special variant preferences that a user wishes to view in the user's interface.

SUMMARY

A first computer system sends a request to a second computer system. The second computer system determines that the first computer system utilizes a message catalog file that is not installed on the second computer system. As a result, the second computer system sends a catalog request that requests the message catalog file. The second computer system receives the message catalog file and sends a response message from the second computer system to the first computer system using the received message catalog file.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Figure 1:
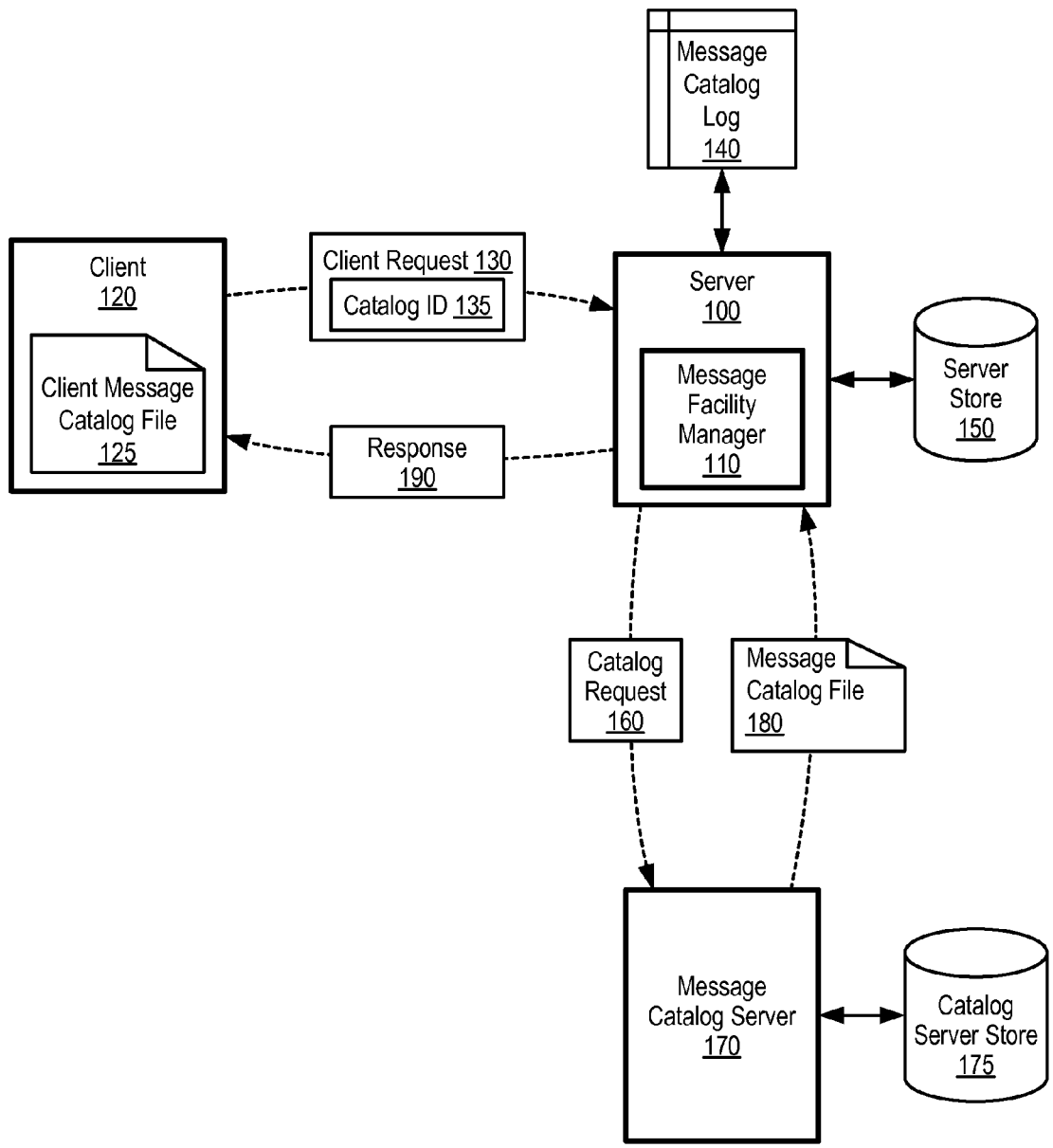
FIG. 1 is a diagram showing an embodiment of a server receiving a client request and acquiring a message catalog file from a message catalog file server in order to respond to the client request.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing an embodiment of a server receiving a client request and acquiring a message catalog file from a message catalog file server in order to respond to the client request. Client 120 generates client request 130, such as a terminal command line-based login request, and sends client request 130 to server 100. Client request 130 includes catalog identifier 135, which identifies client message catalog file 125. Client message catalog file 125 includes, for example, language/locale information corresponding to a regional location of client 120 (e.g., United States, France, Japan, etc.).

In one embodiment, client message catalog file 125 includes, along with other message catalog files discussed herein, a list of information for properly displaying computing environment status on a computing device's display (e.g., statistics data, errors, usages, helps etc). For globalization purpose, message catalog files may be translated into different languages, complied in special formats, and stored in specific directories for message facility manager 110 usages (e.g., "catopen" and/or "catget" commands). Message facility manager 110 may be, for example, a software subroutine executing on server 100.

In addition, message catalog files may include parameters for message facilities such as 1) SetNumber (specifies the set ID), 2) MessageNumber (specifies a message ID), and 3) message string (specifies a default character-string buffer). The SetNumber and MessageNumber parameters may specify a particular message for which to retrieve in the message catalog file. For example, a greeting message catalog file may include:

$set MS_GREETING
M_HELLO "Hello\n"
M_MORNING "Good morning\n"
M_AFTERNOON "Good afternoon\n"

where MS_GREETING is the SetNumber, which includes three MessagesNumbers: M_Hello, M_MORNING and M_AFTERNOON. In one embodiment, each message string may be translated to different languages and, therefore, create different message catalog files such as English/greeting.cat, Japanese/greeting.cat, and French/greeting.cat. Based on a particular language environment (catalog identifier 135 discussed below), message facility manager 110 loads/displays different translated information at run-time for different users in the United States, Japan, and France, respectively.

Server 100 receives client request 130 and extracts catalog identifier 135. Message facility manager 110 accesses message catalog log 140 and compares catalog identifier 135 to catalog entries included in message catalog log 140, which identify corresponding message catalog files included in server store 150 (see FIG. 3B and corresponding text for further details).

Figure 4:
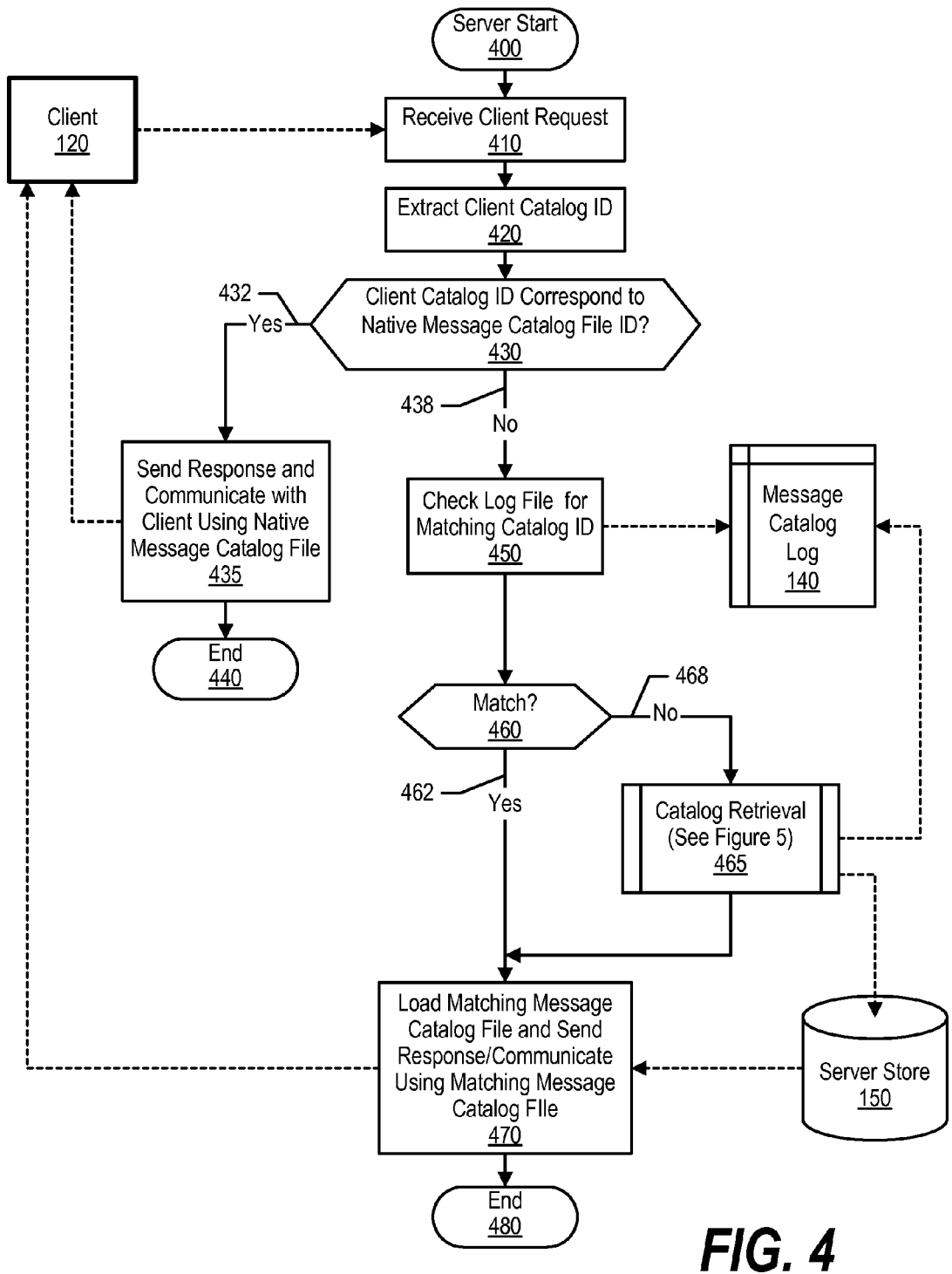
FIG. 4 is an embodiment of a flowchart showing steps taken in processing a client request using a corresponding message catalog file.

When message facility manager 110 detects a catalog entry that matches catalog identifier 135, message facility manager 110 loads the corresponding message catalog file from server store 150 and sends response 190 back to client 120 using the loaded message catalog file (see FIG. 4 and corresponding text for further details).

However, when message facility manager 110 does not identify a matching catalog entry in message catalog log 140, message facility manager 110 sends catalog request 160 to message catalog server 170, requesting a message catalog file that corresponds to catalog identifier 135. Message catalog server 170 retrieves message catalog file 180 from catalog server store 175, and sends message catalog file 180 to server 100. In this embodiment, message catalog file 180 is the same as, or similar to, client message catalog file 125. In turn, message facility manager 110 saves a copy of message catalog file 180 in server store 150 and adds a catalog entry to message catalog log 140 accordingly. Server 100 then uses message catalog file 180 to generate response 190, which is sent to client 120.

In one embodiment, message catalog server 170 may not have a message catalog file that corresponds to catalog identifier 135. In this embodiment, message facility manager 110 may send a catalog request to client 120 in order to acquire client message catalog file 125 (see FIGS. 2, 5, and corresponding text for further details). In another embodiment, when server 100 does not receive a corresponding message catalog file from message catalog server 170 or client 120, the server may use a default message catalog file such as an ASCII-based message catalog file.

Figure 2:
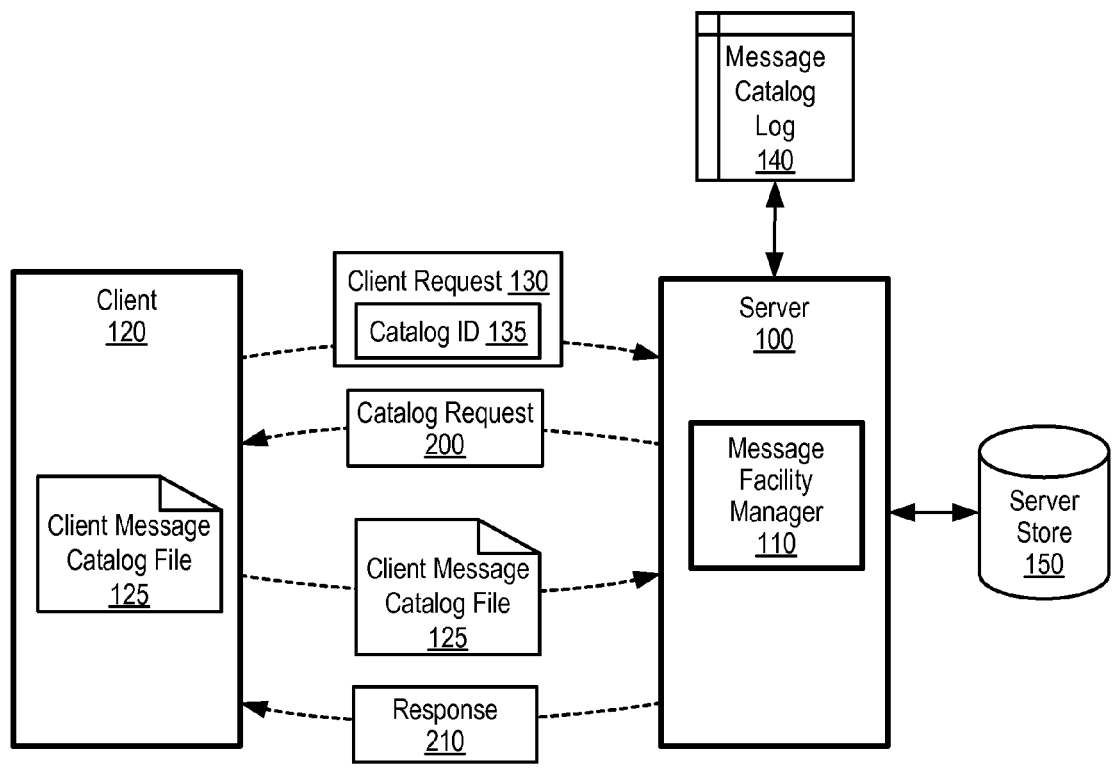
FIG. 2 is a diagram showing an embodiment of a server receiving a client request and acquiring a message catalog file from the client in order to respond to the client request.

FIG. 2 is a diagram showing an embodiment of a server receiving a client request and acquiring a message catalog file from the client in order to respond to the client request. FIG. 2 is similar to FIG. 1 with the exception that message facility manager 110 sends a request (catalog request 200) to client 120 instead of message catalog server 170 to acquire a message catalog file that corresponds to catalog identifier 135. In turn, client 120 sends client message catalog file 125 to message facility manager 110, which stores a copy in server store 150 and adds a catalog entry to in message catalog log 140 accordingly. Message facility manager 110 then uses client message catalog file 125 to generate and send response 210 back to client 120.

Figure 5:
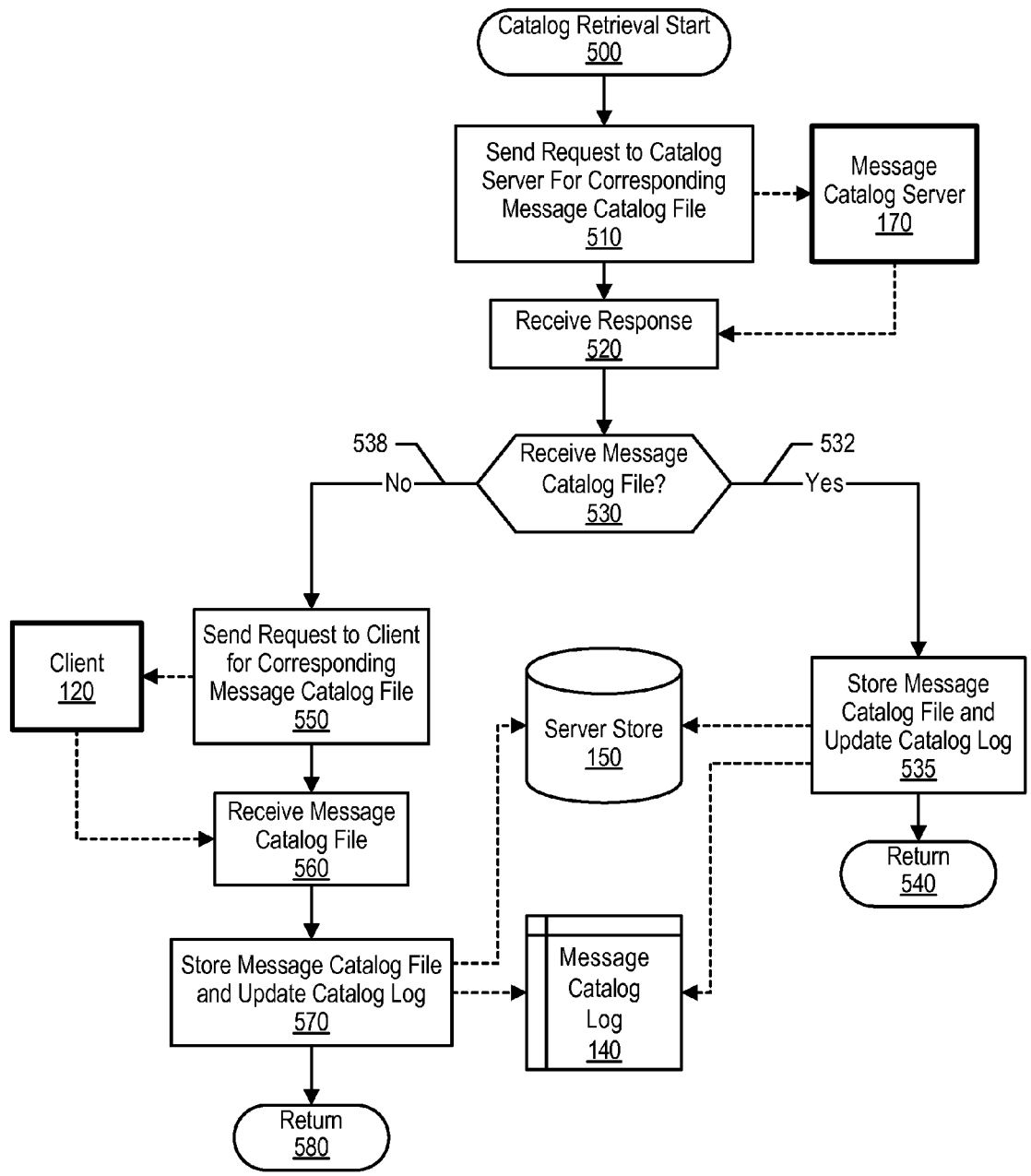
FIG. 5 is an embodiment of a flowchart showing steps taken in requesting a message catalog file in order to respond to a client request.

In one embodiment, message facility manager 110 may be configured to send a first catalog request to message catalog server 170 and, when message catalog server 170 fails to provide a corresponding message catalog file, message facility manager 110 sends a second catalog request to client 120 (see FIG. 5 and corresponding text for further details). In another embodiment, message catalog file 110 may be configured to initially send a catalog request to client 120 to acquire the appropriate message catalog file.

Figure 3A:
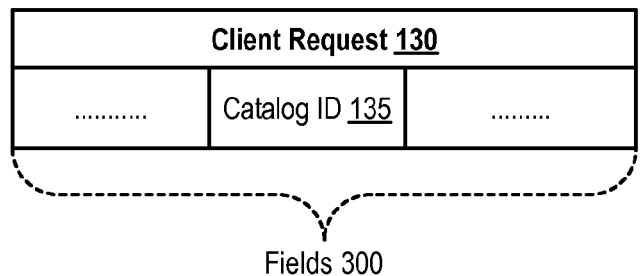
FIG. 3A is a diagram showing an embodiment of a client request that includes a catalog identifier field.

FIG. 3A is a diagram showing an embodiment of a client request that includes a catalog identifier field. Client request 130 includes fields 300, one of which being catalog identifier 135. Catalog identifier 135 is a language/locale identifier field that identifies a message catalog file utilized by client 120 for communicating with server 100 (e.g., client message catalog file 125). Server 100 utilizes catalog identifier 135 for requesting and/or loading the appropriate message catalog file to communicate with client 120 (see FIGS. 4, 5, and corresponding text for further details).

Figure 3B:
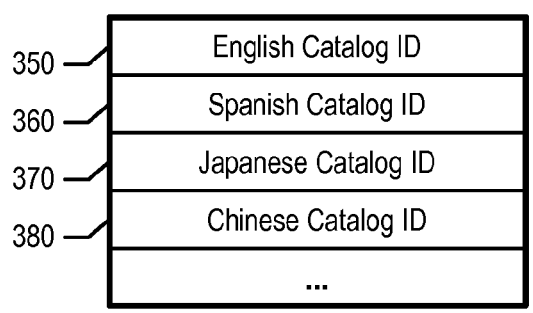
FIG. 3B is a diagram showing an embodiment of a message catalog log that includes catalog entries.

FIG. 3B is a diagram showing an embodiment of a message catalog log that includes catalog entries. Message catalog log 140 is the same as that shown in FIG. 1, and includes catalog entries 350-380. Each of catalog entries 350-380 correspond to a message catalog file that is included in server store 150, which is available for use by server 100. When server 100 receives a client request, server 100 extracts a catalog identifier from the client request (see FIG. 3A and corresponding text for further details), and compares the extracted catalog identifier with catalog entries 350-380. When the server detects a match, the server retrieves a corresponding message catalog file from server store 150 and responds to the client request accordingly. However, when server 100 does not detect a match, server 100 requests the message catalog file from message catalog server 170 and/or client 120 (see FIG. 5 and corresponding text for further details).

FIG. 4 is an embodiment of a flowchart showing steps taken in processing a client request using a corresponding message catalog file. Server processing (e.g. message facility manager 110) commences at 400, whereupon the server receives a client request from client 120 at step 410. At step 420, the server extracts a client catalog identifier from the client request that indicates a particular message catalog file for which client 120 communicates (see FIG. 3A and corresponding text for further details).

A determination is made as to whether the client catalog identifier corresponds to the server's native message catalog file, which is a message catalog file for which the server communicates (decision 430). For example, client 120 may be located in the United States and the server may be located in Japan. In this example, the client catalog identifier may correspond to an English message catalog file and the server's native message catalog file may be a Japanese message catalog file.

If the client catalog identifier corresponds to the server's native message catalog file, decision 430 branches to "Yes" branch 432 whereupon the server sends a response, along with subsequent communications, to client 120 using the server's native message catalog file (step 435). For example, the server may send a "welcome/login" message or a date/time message. Processing ends at 440.

On the other hand, if the client catalog identifier does not correspond to the server's native message catalog file, decision 430 branches to "No" branch 438, whereupon the server access message catalog log 140 (step 450), and a determination is made as to whether message catalog log 140 includes a catalog entry that matches the client catalog identifier (decision 460). Message catalog log 140 includes a list of corresponding message catalog files that are included in server store 150 and available for the server to utilize when responding to clients (see FIG. 3B and corresponding text for further details).

If a matching entry exists, decision 460 branches to "Yes" branch 462 whereupon the server loads the corresponding message catalog file from server store 150 and sends a response, along with subsequent communications, to client 120 using the loaded message catalog file (step 470). Processing ends at 480.

On the other hand, if message catalog log 140 does not include a matching entry, decision 460 branches to "No" branch 468 whereupon the server sends a request for the message catalog file (e.g., to a message catalog server; to client 120; or both); stores the message catalog file in server store 150; and updates message catalog log 140 accordingly (pre-defined process block 465, see FIG. 5 and corresponding text for further details). At step 470, the server loads the received message catalog file from server store 150 and sends a response, along with subsequent communications, to client 120 using the loaded message catalog file (step 470). Processing ends at 480.

FIG. 5 is an embodiment of a flowchart showing steps taken in requesting a message catalog file in order to respond to a client request. At times, a server may receive a client request that corresponds to a particular language that the server does not have a corresponding message catalog file. At these times, the server queries a message catalog server and/or the client in order to acquire the corresponding message catalog file and respond to the client.

Server processing (e.g., message facility manager 110) commences at 500, whereupon the server sends a catalog request to message catalog server 170 that requests a corresponding message catalog file (step 510). At step 520, the server receives a response from message catalog server 170, and a determination is made as to whether message catalog server 170 provided the corresponding message catalog file (decision 530). If message catalog server 170 provided the message catalog file, decision 530 branches to "Yes" branch 532 whereupon the server stores the received message catalog file in server store 150 and updates message catalog log 140 by adding a catalog entry that includes a catalog identifier corresponding to the received message catalog file (step 535). Processing returns at 540.

On the other hand, if the server did not receive the message catalog file from message catalog server 170, decision 530 branches to "No" branch 538, whereupon the server sends a catalog request to client 120 at step 550. Client 120 is the same client that originally sent the client request. In one embodiment, the server may send a broadcast catalog request to multiple clients in an effort to receive the corresponding message catalog file from one of the clients.

At step 560, the server receives the message catalog file from client 120. Next, at step 570, the server stores the received message catalog file in server store 150 and updates message catalog log 140 by adding a catalog entry that includes a catalog identifier corresponding to the received message catalog file. In one embodiment, if the server does not receive a corresponding message catalog file from message catalog server 170 or client 120, the server may use a default message catalog file such as an ASCII-based message catalog file. Processing returns at 580.

Figure 6:
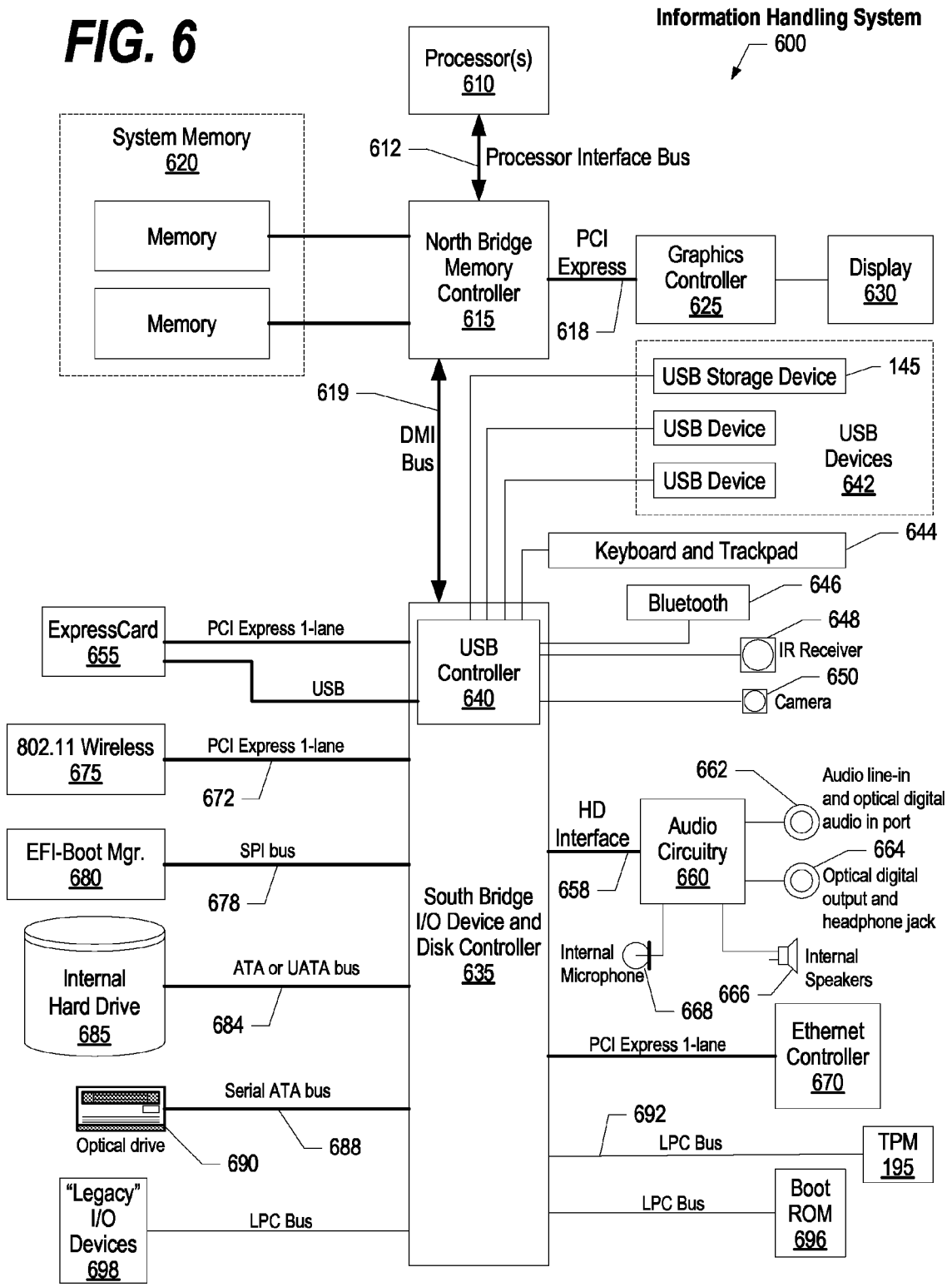
FIG. 6 is a block diagram example of a data processing system in which the methods described herein can be implemented.

FIG. 6 illustrates information handling system 600, which is a simplified example of a computer system capable of performing the computing operations described herein. Information handling system 600 includes one or more processors 610 coupled to processor interface bus 612. Processor interface bus 612 connects processors 610 to Northbridge 615, which is also known as the Memory Controller Hub (MCH). Northbridge 615 connects to system memory 620 and provides a means for processor(s) 610 to access the system memory. Graphics controller 625 also connects to Northbridge 615. In one embodiment, PCI Express bus 618 connects Northbridge 615 to graphics controller 625. Graphics controller 625 connects to display device 630, such as a computer monitor.

Northbridge 615 and Southbridge 635 connect to each other using bus 619. In one embodiment, the bus is a Direct Media Interface (DMI) bus that transfers data at high speeds in each direction between Northbridge 615 and Southbridge 635. In another embodiment, a Peripheral Component Interconnect (PCI) bus connects the Northbridge and the Southbridge. Southbridge 635, also known as the I/O Controller Hub (ICH) is a chip that generally implements capabilities that operate at slower speeds than the capabilities provided by the Northbridge. Southbridge 635 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 696 and "legacy" I/O devices (using a "super I/O" chip). The "legacy" I/O devices (698) can include, for example, serial and parallel ports, keyboard, mouse, and/or a floppy disk controller. The LPC bus also connects Southbridge 635 to Trusted Platform Module (TPM) 695. Other components often included in Southbridge 635 include a Direct Memory Access (DMA) controller, a Programmable Interrupt Controller (PIC), and a storage device controller, which connects Southbridge 635 to nonvolatile storage device 685, such as a hard disk drive, using bus 684.

ExpressCard 655 is a slot that connects hot-pluggable devices to the information handling system. ExpressCard 655 supports both PCI Express and USB connectivity as it connects to Southbridge 635 using both the Universal Serial Bus (USB) the PCI Express bus. Southbridge 635 includes USB Controller 640 that provides USB connectivity to devices that connect to the USB. These devices include webcam (camera) 650, infrared (IR) receiver 648, keyboard and trackpad 644, and Bluetooth device 646, which provides for wireless personal area networks (PANs). USB Controller 640 also provides USB connectivity to other miscellaneous USB connected devices 642, such as a mouse, removable nonvolatile storage device 645, modems, network cards, ISDN connectors, fax, printers, USB hubs, and many other types of USB connected devices. While removable nonvolatile storage device 645 is shown as a USB-connected device, removable nonvolatile storage device 645 could be connected using a different interface, such as a Firewire interface, etcetera.

Wireless Local Area Network (LAN) device 675 connects to Southbridge 635 via the PCI or PCI Express bus 672. LAN device 675 typically implements one of the IEEE 802.11 standards of over-the-air modulation techniques that all use the same protocol to wirelessly communicate between information handling system 600 and another computer system or device. Optical storage device 690 connects to Southbridge 635 using Serial ATA (SATA) bus 688. Serial ATA adapters and devices communicate over a high-speed serial link. The Serial ATA bus also connects Southbridge 635 to other forms of storage devices, such as hard disk drives. Audio circuitry 660, such as a sound card, connects to Southbridge 635 via bus 658. Audio circuitry 660 also provides functionality such as audio line-in and optical digital audio in port 662, optical digital output and headphone jack 664, internal speakers 666, and internal microphone 668. Ethernet controller 670 connects to Southbridge 635 using a bus, such as the PCI or PCI Express bus. Ethernet controller 670 connects information handling system 600 to a computer network, such as a Local Area Network (LAN), the Internet, and other public and private computer networks.

While FIG. 6 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 695) shown in FIG. 6 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 7.

Figure 7:
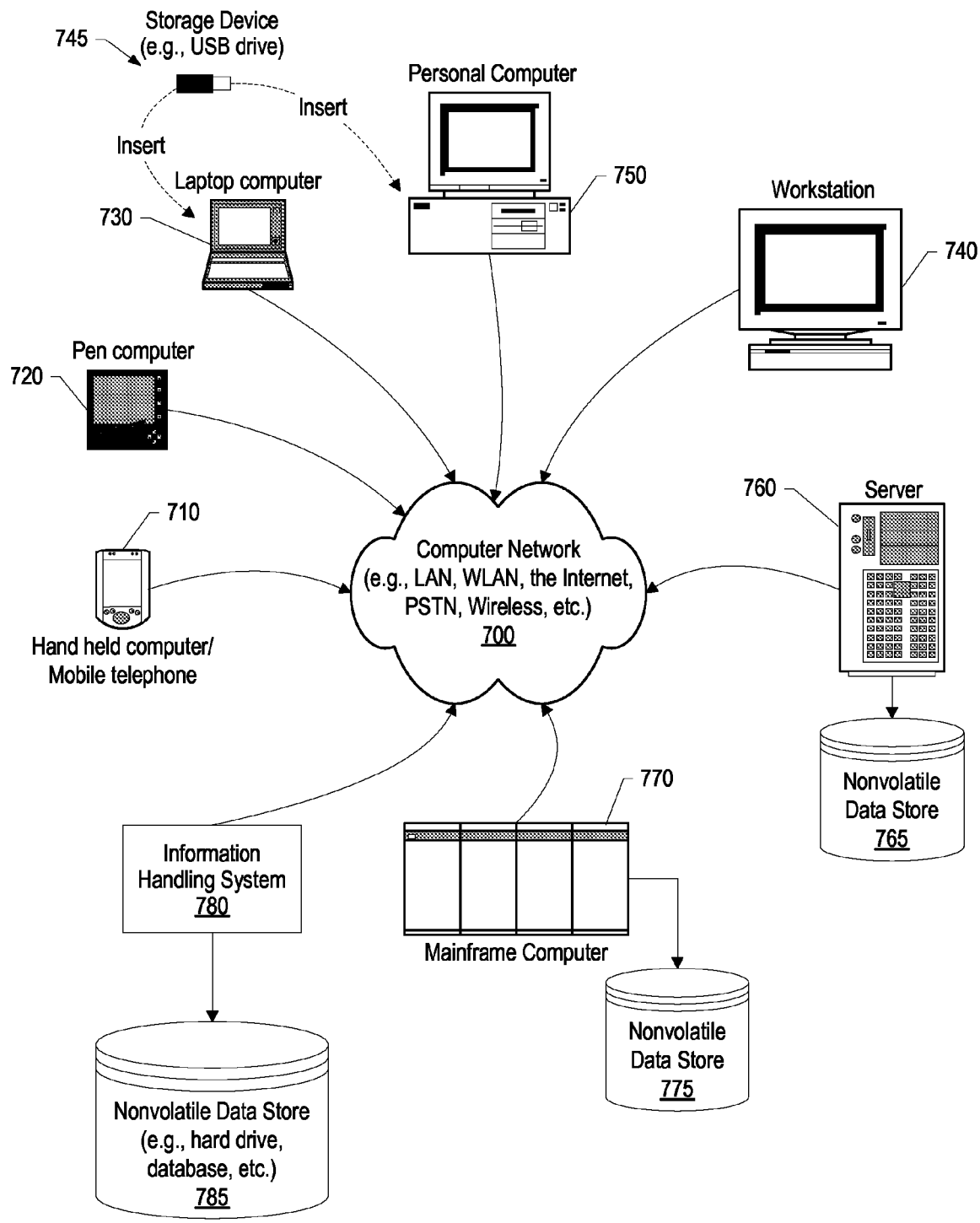
FIG. 7 provides an extension example of the information handling system environment shown in FIG. 6 to illustrate that the methods described herein can be performed on a wide variety of information handling systems which operate in a networked environment.

FIG. 7 provides an extension example of the information handling system environment shown in FIG. 6 to illustrate that the methods described herein can be performed on a wide variety of information handling systems that operate in a networked environment. Types of information handling systems range from small handheld devices, such as handheld computer/mobile telephone 710 to large mainframe systems, such as mainframe computer 770. Examples of handheld computer 710 include personal digital assistants (PDAs), personal entertainment devices, such as MP3 players, portable televisions, and compact disc players. Other examples of information handling systems include pen, or tablet, computer 720, laptop, or notebook, computer 730, workstation 740, personal computer system 750, and server 760. Other types of information handling systems that are not individually shown in FIG. 7 are represented by information handling system 780. As shown, the various information handling systems can be networked together using computer network 700. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 7 depicts separate nonvolatile data stores (server 760 utilizes nonvolatile data store 765, mainframe computer 770 utilizes nonvolatile data store 775, and information handling system 780 utilizes nonvolatile data store 785). The nonvolatile data store can be a component that is external to the various information handling systems or can be internal to one of the information handling systems. In addition, removable nonvolatile storage device 745 can be shared among two or more information handling systems using various techniques, such as connecting the removable nonvolatile storage device 745 to a USB port or other connector of the information handling systems.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A computer program product stored in a computer readable storage device, comprising functional descriptive material that, when executed by an information handling system, causes the information handling system to perform actions comprising:
   receiving a request from a first computer system at the information handling system, wherein the request includes a catalog identifier that identifies a message catalog file utilized by the first computer system to generate the request in a first language corresponding to a regional location of the first computer system;
   determining, at the information handling system, that the catalog identifier does not correspond to a native message catalog file included on the information handling system, the native message catalog file corresponding to a second language that is different than the first language;
   sending, from the information handling system, a catalog request to the first computer system that requests the message catalog file in response to determining that the catalog identifier does not correspond to the native message catalog file;
   receiving the message catalog file from the first computer system in response to sending the catalog request; and
   sending a response message to the first computer system using the received message catalog file.

2. The computer program product of claim 1 wherein:
   the message catalog file includes information for the information handling system to generate the response message in the first language that corresponds to the regional location of the first computer system.

3. The computer program product of claim 2 wherein:
   the information includes one or more message strings extracted by the information handling system that are written in the first language; and
   the response message includes one or more of the extracted message strings.

4. The computer program product of claim 1 wherein the functional descriptive material, when executed by the information handling system, causes the information handling system to perform further actions comprising:
   extracting the catalog identifier from the client request;
   determining whether a log file includes the extracted catalog identifier; and
   performing the sending of the catalog request in response to determining that the log file fails to include the extracted catalog identifier.

5. The computer program product of claim 4 wherein, in response to receiving the message catalog file, the functional descriptive material, when executed by the information handling system, causes the information handling system to perform further actions comprising:
   updating the log file to include the catalog identifier; and
   storing the message catalog file in a memory storage area.

6. An information handling system comprising:
   one or more processors;
   a memory accessible by at least one of the processors; a set of instructions stored in the memory and executed by at least one of the processors in order to perform actions of:
   receiving a request from a first computer system at the information handling system, wherein the request includes a catalog identifier that identifies a message catalog file utilized by the first computer system to generate the request in a first language corresponding to a regional location of the first computer system;

determining at the information handling system based upon the catalog identifier, that the catalog identifier does not correspond to a native message catalog file included on the information handling system, the native message catalog file corresponding to a second language that is different than the first language;

sending a catalog request to the first computer system that requests the message catalog file in response to determining that the catalog identifier does not correspond to the native message catalog file;

receiving the message catalog file from the first computer system in response to sending the catalog request; and sending a response message to the first computer system using the received message catalog file.

7. The information handling system of claim 6 wherein:
the message catalog file includes information for the information handling system to generate the response message in the first language that corresponds to the regional location of the first computer system.

8. The information handling system of claim 7 wherein:
the information includes one or more message strings extracted by the information handling system that are written in the first language; and
the response message includes one or more of the extracted message strings.

9. The information handling system of claim 6 wherein the set of instructions, when executed by one of the processors, further performs actions of:
extracting the catalog identifier from the client request;
determining whether a log file includes the extracted catalog identifier; and
performing the sending of the catalog request in response to determining that the log file fails to include the extracted catalog identifier.

* * * * *